US006940309B1

(12) United States Patent
Sallese

(10) Patent No.: US 6,940,309 B1
(45) Date of Patent: Sep. 6, 2005

(54) PROGRAMMABLE LOGIC DEVICE WITH A MEMORY-BASED FINITE STATE MACHINE

(75) Inventor: Kevin E. Sallese, Plainfield, IL (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 25 days.

(21) Appl. No.: 10/624,965

(22) Filed: Jul. 21, 2003

(51) Int. Cl.$^7$ .......................... H03K 19/173; G06F 7/38
(52) U.S. Cl. ............................................ 326/46; 326/38
(58) Field of Search ............................. 326/37, 38, 39, 326/40, 46, 93

(56) References Cited

U.S. PATENT DOCUMENTS

| 5,825,199 A | * | 10/1998 | Shelton et al. ................. 326/38 |
| 5,926,036 A | * | 7/1999 | Cliff et al. ..................... 326/40 |
| 6,803,787 B1 | * | 10/2004 | Wicker, Jr. ..................... 326/46 |
| 2004/0221078 A1 | * | 11/2004 | Sanuel et al. ................ 710/107 |

OTHER PUBLICATIONS

Streamline Design Efforts With The New SPI4–2 Interface, by John Deatherage, Intel Developer UPDATE Magazine, Sep. 2002, pp. 1–6.

3.3V Programmable Skew PLL Clock Driver Turboclock, IDT5V991A, Commercial and Industrial Temperature Ranges, Sep. 2001, pp. 1–10.

One–PLL General Purpose Flash–Programmable Clock Generator, CY22050, Cypress Semiconductor Corporation, San Jose, CA, Revised Dec. 14, 2002, pp. 1–8.

ICS541, PLL Clock Divider, Revision 021303, Integrated Circuit Systems, Inc. pp. 1–5, no date.

User Programmable Laser Engine Pixel Clock Generator, ICS1574B, Aug. 31, 2000, pp. 1–12.

EEPROM Programmable 3–PLL Clock Generator IC, FS6370–01, AMI Semiconductor, pp. 1–39, no date.

* cited by examiner

Primary Examiner—Daniel D. Chang
(74) Attorney, Agent, or Firm—MacPherson Kwok Chen & Heid LLP; Jon W. Hallman

(57) ABSTRACT

A programmable logic device is programmed to implement a finite state machine that may sequence through a plurality of states in a single clock cycle of the programmable logic device. The programmable logic device includes a plurality of programmable blocks programmed to instantiate memories. Each memory is programmed to determine a next state of the finite state machine based upon a current state of the finite state machine and current input conditions for the finite state machine.

20 Claims, 3 Drawing Sheets

PROGRAMMABLE LOGIC DEVICE WITH A MEMORY-BASED FINITE STATE MACHINE

TECHNICAL FIELD

The present invention relates to programmable logic devices (PLDs) such as complex PLDs (CPLDs) or field programmable gate arrays (FPGAs), and more particularly to a finite state machine configured within a PLD.

BACKGROUND

Although modern communication protocols enable the transmission of billions of bits per second, conventional backplane switching systems and related components do not have comparable clock rates. For example, the System Packet Interface 4 (SPI4) protocol requires a minimum throughput rate of 10 gigabits per second over a native bus width of 16 bits using Double Data Rate (DDR) techniques. At a throughput rate of 10 gigabits, such a bus is thus sampled at a 625 MHz rate. Because of the DDR sampling (sampling at both the rising and falling edge of the clock), the bus is clocked at 312.5 MHz. However, many ASICs and FPGAs cannot achieve even a 312.5 MHz clocking rate. Thus, external SPI4 buses routed to such devices must be demultiplexed according to a slower single edge clock rate that is a fraction of the external 625 MHZ sampling rate. For example, an FPGA having a single edge clock rate that is $\frac{1}{4}^{th}$ the sampling rate of the external SPI4 bus receives four 16-bit words (typically denoted as tokens) from the SPI4 bus per FPGA clock cycle. The four tokens are then routed within the FPGA on a four-token wide bus that is clocked at the lower clock rate.

In a wire-line-level protocol such as SPI4, these tokens must be parsed one at a time according to their order of arrival to ensure that they comply with the SPI4 protocol. Typically, a finite state machine implemented within the FPGA is used to parse the tokens. For example, this parsing may be expressed in the form of IF THEN statements such as "If in state A and input B occurs, Then transition to state C." As is known in the arts, a user must configure an FPGA using one of a variety of available software tools before it can implement the desired function. For example, with respect to the just-described finite state machine, the necessary IF THEN statements may be written in a suitable language for these tools such as RTL. The RTL code is then converted by the programming tool to Boolean logic that may be implemented using primitive logic gates (e.g., a 4-input AND gate). The programming tool programs a configuration memory within the FPGA so as to instantiate programmable blocks within the device to implement these primitive logic gates.

However, this conventional FPGA programming process often proves to be problematic. The parsing of tokens with the FPGA (such as the four in the above example) must occur within one FPGA clock cycle because of the difference between the FPGA clock rate and the external SPI4 bus sampling rate. Current state and next state information required at each token level must then appear as combinatorial nodes between each token produced by identical state flow processors. This structure results in deep combinatorial logic that is at least N levels deep where N corresponds to the number of tokens processed. During a clock cycle, the state variables resulting from the last-processed token are sampled and appear as inputs to the next group of tokens received in the next clock cycle. Processing of a token cannot begin, however, until the disposition of the immediately-preceding token is known since it is a required input for the processing of the token.

A conventional finite state machine 10 for processing multiple tokens during a single clock cycle is shown in FIG. 1a. In this example, the state machine's clock 15 cycles at a rate $\frac{1}{4}^{th}$ that of an external wire-line-level bus (not illustrated) such as a SPI4 bus. After demultiplexing, finite state machine 10 must thus process four tokens registered in an input register 20 at every cycle of clock 15. Because of the wire-line-level protocol, the tokens must be parsed by state machine 10 in their arrival order. To indicate this arrival order, the tokens are denoted as token_1 through a token_4. Each token is processed in view of the current state machine state (corresponding to the preceding token) and the current input conditions (derived from the current token) to generate a "next state" state value for the subsequent token. With respect to the subsequent token, this "next state" becomes the current state, and so on. Combinatorial nodes L1 through L4, each implemented in primitive logic gates as described previously, perform the processing for corresponding tokens token_1 through token_4. For example, combinatorial node L2 processes token_2 using a current state 30 from combinatorial node L1 and current token inputs or conditions 35 derived from token_2. Similarly, combinatorial node L3 processes token_3 using the current state 40 from combinatorial node L2 and input conditions 45 from token_3. Combinatorial node L4 processes token_4 using a current state 50 from combinatorial node L3 and input conditions 55 from token_4. Combinatorial node L1 processes token_1 using a current state 60 from combinatorial node L4 and input conditions 65 from token_1. Because current state 60 is generated in the preceding clock cycle with respect to the processing performed by combinatorial node L1, a state register 70 is necessary to store current state 60 so it may be used by combinatorial node L1 in the subsequent clock cycle.

Although implementing such a finite state machine has been manageable for ASIC technologies, such an implementation has proven to be extremely challenging for FPGA technologies. With current software development tools, difficulties arise as early as the synthesis phase in that the absolute minimum number of logic levels (N) is not always realizable nor easily controllable from one synthesis run to another. Further difficulties arise in the back-end mapping phase in which access to limited wide function logic resources occurs. The placement phase, even when floor-planning is used, does not produce ideal placement or reproducible results. This may be seen in FIG. 1b, where a programmable logic device 100 having a plurality of logic blocks 105 is instantiated to perform the combinatorial logic described with respect to FIG. 1a. Each combinatorial node L1 through L4 will be spread across multiple logic blocks in the non-ideal fashion just described. The same can be said for the routing of combinatorial outputs from one node to the next. The resulting design produces a performance level that is lower than optimal and subject to wide fluctuations from build-to-build as a design evolves. Moreover, because of the required constant wire-line speeds, pipe-lining or parallel processing techniques cannot be used to avoid the problem of multiple logic levels.

Accordingly, for this and other reasons, there is a need in the art for an improved finite state machine design that can sequence through multiple states during a single PLD clock cycle.

SUMMARY

One aspect of the invention relates to a programmable device configured to implement a finite state machine that may sequence through a plurality of states during a single cycle of a clock for the programmable device. The programmable device is configured to process a plurality of input signals arranged from a first signal to a last signal. The programmable device includes a plurality of programmable blocks, wherein a subset of the programmable blocks are each programmed to instantiate a memory, the memories corresponding on a one-to-one basis with the plurality of input signals such that a first memory corresponds to the first input signal, and so on, each memory being programmed to retrieve a data word for determining a next state of the finite state machine, the data word being retrieved according to an address derived both from a current state of the finite state machine and from the corresponding input signal.

Another aspect of the invention relates to a method of sequencing a finite state machine implemented in a programmable device through multiple states in a single cycle of an internal clock for the programmable device. The programmable device includes a set of programmable blocks. The method includes an act of programming each programmable block to instantiate a memory, wherein each memory is programmed to retrieve a data word representing a next state of the finite state machine based upon address signals, and wherein the memories are arranged from a first memory to a last memory. During each of a sequence of the clock cycles, the method includes acts of registering a plurality of input signals, wherein the plurality of input signals corresponds on a one-to-one basis with the plurality of memories such the plurality of input signals are arranged from a first input signal to a last input signal; sequencing the finite state machine by sequentially retrieving a first data word form the first memory based upon an address derived both from an initial state and from the first input signal; then retrieving a second data word from the second memory based upon an address derived both from the first data word and from the second input signal; and so on until a last data word is retrieved from the last memory based upon an address derived from both a next-to-last data word and from the last input signal. Finally, the method includes an act of registering the last data word so it may be used to form the initial state for the next clock cycle.

BRIEF DESCRIPTION OF THE DRAWINGS

FIG. 1b is a simplified block diagram of a field programmable gate array device programmed to implement the conventional finite state machine of FIG. 1a.

Use of the same reference symbols in different figures indicates similar or identical items.

DETAILED DESCRIPTION

The present invention uses read-only memories (ROMs) to implement the combinatorial nodes that determine the next state of a finite state machine based upon current state and token input conditions. Although described with respect to a wire-line-level protocol, it will be appreciated that the finite state machine of the present invention may be used in any situation in which input conditions must be sequentially parsed during a single clock cycle such that, with respect to a given input condition, the next state depends upon the given input condition and the current state as determined from the previous input condition.

Figure 1A:
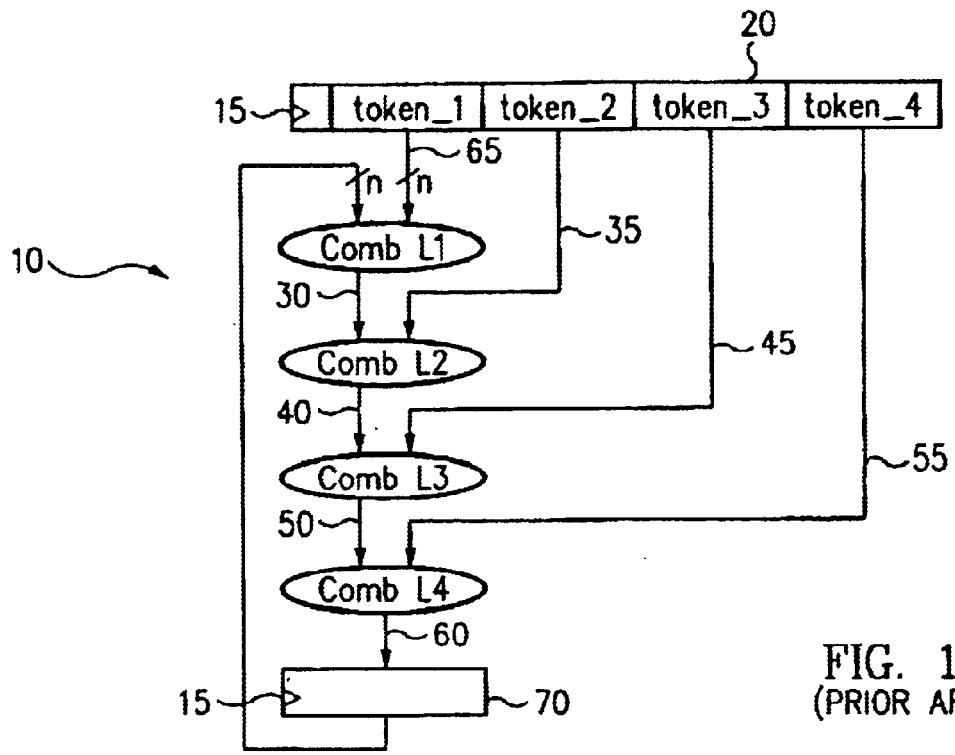
FIG. 1a is a block diagram of a conventional finite state machine for processing multiple tokens in one clock cycle using combinatorial nodes implemented using primitive logic gates.
Figure 1B:
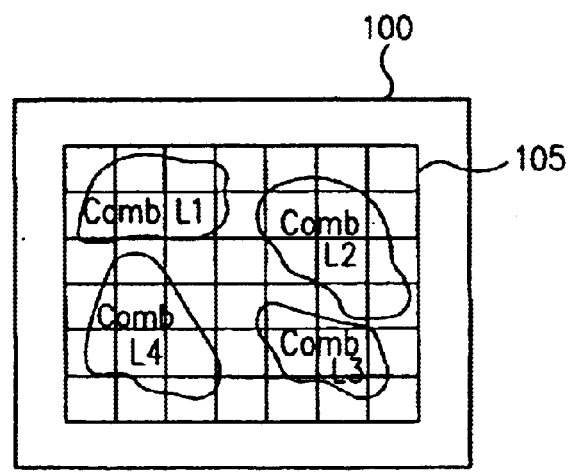
Figure 2:
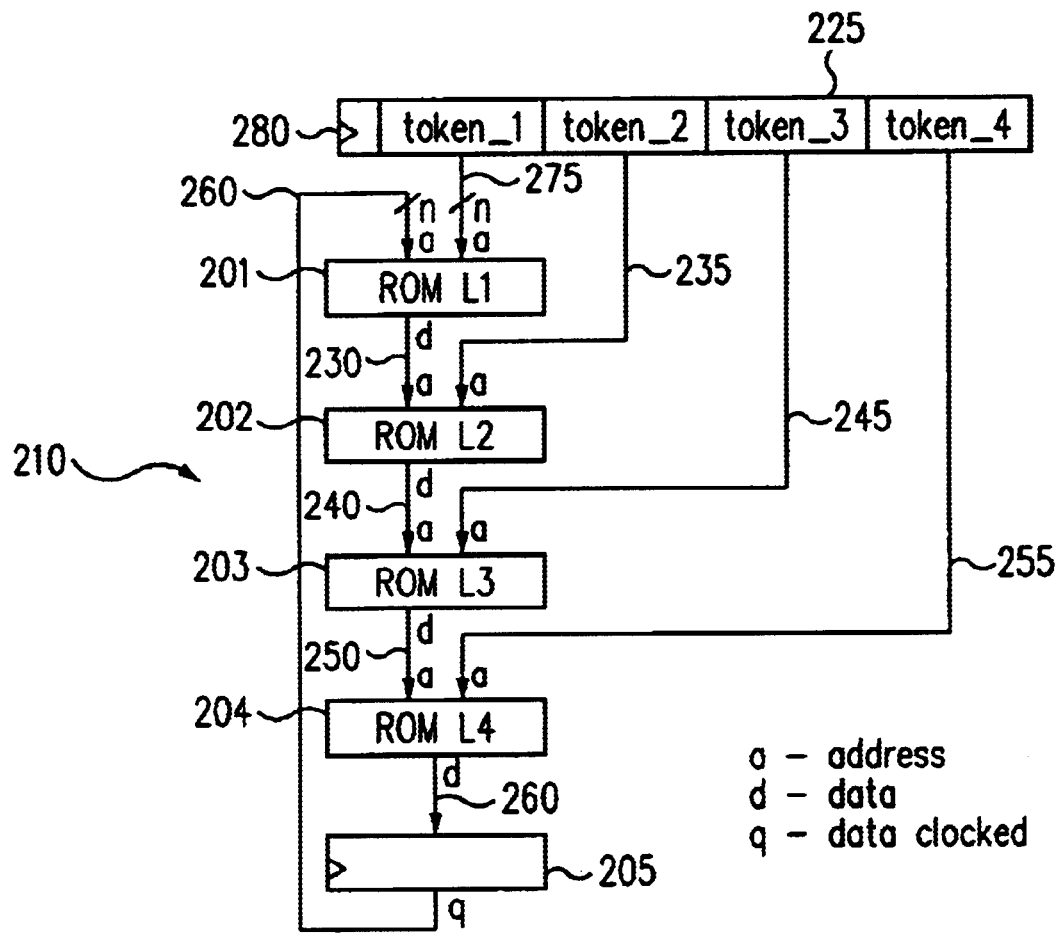
FIG. 2 is a block diagram of a finite state machine for processing multiple tokens in one clock cycle using combinatorial nodes implemented using ROMs according to one embodiment of the invention.
Figure 4:
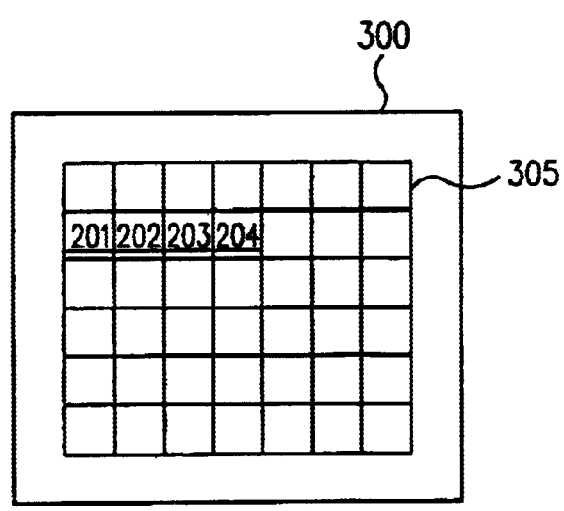
FIG. 4 is a simplified block diagram of a field programmable gate array device that may be programmed to implement the present invention.

Turning now to FIG. 2, ROMs 201 through 204 implement a finite state machine 210 to parse tokens stored in an input register 225. As seen in FIG. 4, each ROM 201 through 204 may be implemented in a corresponding programmable block 305 of a conventional field programmable gate array (FPGA) 300 using software design tools. As is known in the art, each programmable block 305 includes one or more look-up tables (LUTs) (not illustrated) that may be programmed with the truth tables of a desired logical function. Since each LUT requires an array of memory cells to store the truth table, each programmable block may also be configured as a read-only memory (ROM).

Because of the wire-line-level protocol, each token must be processed sequentially starting from token_1 through token_4. Each token is a sample of an external bus (not illustrated). The tokens are demultiplexed from the external bus and registered in an input register 225. Input register 225, in conjunction with other circuitry in FPGA 300, is clocked using an internal clock 280 that cycles at $\frac{1}{4}^{th}$ the rate of the external bus' clock rate. Thus, finite state machine 210 must sequentially process token_1 through token_4 in a single cycle of internal clock 280. The state machine processing for each token is the same so that the memory contents for each ROM 201 through 204 are identical and are easily obtainable based upon the required state diagram for finite state machine 210. In turn, the required state diagram depends upon the particular wire-line-level protocol being implemented.

Figure 3:
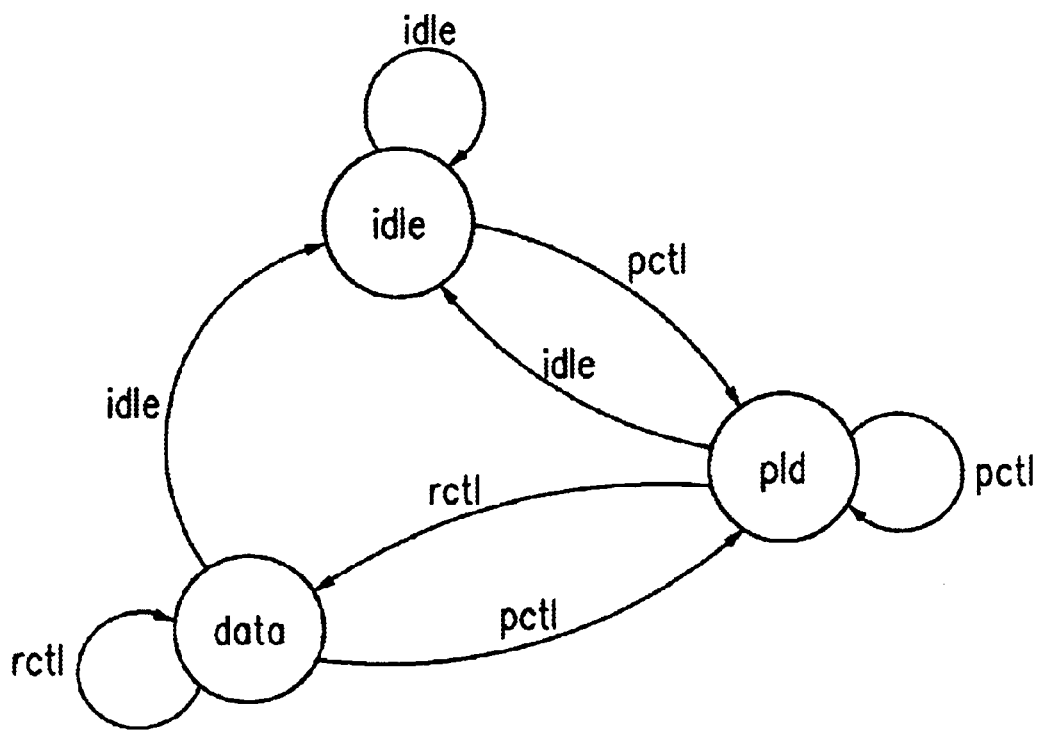
FIG. 3 is a state diagram for a finite state machine implemented in a programmable device according to one embodiment of the invention.

A state diagram for a SPI4 protocol is shown in FIG. 3. There are three possible states: an idle state (idle), a payload control state (pld), and a data state (data). The corresponding input conditions for this state diagram are derived from the tokens (or from their associated out-of-band signals). These input conditions are denoted as idle, payload control (pctl), and rctl. These input conditions are mutually exclusive in that only one of them should be active at any given time. Violations of this mutual exclusivity result in error flag production. For example, if rctl goes active in the idle state while idle is active, an idle error flag is generated. It will be appreciated, however, that the specifics of the state machine being implemented are unimportant to the present invention.

Each ROM 201 through 204 is programmed to do the finite state machine sequencing for its corresponding token, token_1 through token_4, respectively. Thus, ROM 201 is programmed to determine the next state for finite state machine 210 based upon input conditions determined from token_1, ROM 202 does the same for token_2, ROM 203 for token_3, and ROM 204 for token_4 ROMs 201 through 204 are each programmed to provide the next state for finite state machine 210 based upon the current state and input conditions from the corresponding token, token_1 through token_4, respectively. ROMs 201 through 204 are stacked such that data 230 from ROM 201 become address inputs for ROM 202. Thus, ROM 201 is programmed such that data outputs 230 form the next state for finite state machine 210. Additional address inputs 235 from token_2 to ROM 202 supply the current input conditions. ROM 202 is thus programmed to determine the next state for finite state machine 210 (data outputs 240) based upon the current state (address inputs 230) and the current input conditions (address inputs 235). In turn, data outputs 240 as used by ROM 203 as address inputs 240 in conjunction with additional address inputs 245 from token_3 to select a data output 250 from ROM 203. Using data output 250 as an address input (to provide the current state) in conjunction with additional address inputs 255 from token_4 (to provide the current input conditions), ROM 204 retrieves a data output 260 (to specify the next state). Because data output 260 will serve as address inputs 260 for ROM 201 in the next cycle of internal clock 280, data output 260 must be registered. Although a state register 205 is shown in FIG. 2 to perform this registration, it is symbolic in that each programmable block 305 of FPGA 300 may be configured to register its outputs within its macrocells (not illustrated). Accordingly, no routing need be performed to accomplish the registration of data output 260. In the subsequent cycle of clock 280, ROM 201 uses data output 260 as an address input 260 in conjunction with address inputs 275 derived from token_1. Unlike data output 260 from ROM 204, the data outputs from ROMs 201 through 203 need not be clocked or registered.

Each ROM 201 through 204 may be captured as components from the library for FPGA 300 using a structural net-list such that their contents are easily conveyed. Each ROM 201 through 204 is then implemented within a programmable block 305 as shown in FIG. 4. Placement of ROMs 201 through 204 in adjacent programmable blocks 305 facilitates a natural routing flow—there can be no better routing between programmable blocks 305 such that the data outputs of one programmable block 305 flow as inputs to an adjacent programmable block 305. Standard RTL-level placement coordinates (identifying the row and column placement of a given programmable block 305) guarantees this optimal routing condition. Of course, it will be appreciated that non-adjacent programmable blocks 305 may be used in the present invention at the cost of additional routing delay and complication.

The finite state machine 210 of FIG. 2 may be generalized to process any number of tokens in a given cycle of internal clock 280 and instantiated into FPGA 300. To perform this instantiation, a programmable block 305 is assigned to each token that must be processed. The tokens are arranged from a first-to-be analyzed token to a last-to-be analyzed token. Thus, a first programmable block corresponds to the first-to-be analyzed token, a second programmable block corresponds to the next-to-be analyzed token, and so on until a final programmable block corresponds to the last-to-be analyzed token. The data outputs of the final programmable block are clocked and fed back as address inputs to the first programmable block. The remaining programmable blocks are daisy-chained as described with respect to FIG. 2 such that the data outputs of the first programmable block become the address inputs to the second programmable block, and so on. Each programmable block 305 from the first to the last are instantiated as a ROM programmed to calculate the next state of finite state machine 210 based upon the current state and the current input conditions. For a given ROM, the current state corresponds to the next state determined by the preceding ROM. The current input conditions are derived from each ROM's corresponding token. In this fashion, finite state machine 210 is sequenced from state-to-state as it processes each token.

As is known in the art, a variety of synthesis software tools may be used to instantiate finite state machine 210 into a programmable device such as FPGA 300. For example, the following section of RTL code may be used to capture a 4-level (to process 4 tokens) finite state machine. The SPI4 wire-line-level protocol for the 4 tokens is such that the finite state machine may be in one of four states in response to each token. Thus, 2 bits are necessary to specify the state. Four ROMS are instantiated into the programmable device, one for each token. Each ROM may have a depth of 32 words such that 5 address bits are necessary to retrieve a particular data word. Each retrieved data word determines the next state of the desired finite state machine. From the retrieved data word, two bits such as the least two significant bits may be used to specify the next state as address bits for the next ROM stage. Additional bits in the retrieved data word may be used for control and other functions unrelated to the necessary state sequencing. From each token, the current input conditions are derived as three additional address bits. From the following example RTL code segment, the programmable blocks will be instantiated into ROMs such that the outputs of one ROM may form the inputs to an adjacent ROM as described previously. For example, the first ROM is chosen to have the coordinates "R28C9" indicating the row (number 28) and the column (number 9) position of the programmable block that will be instantiated to form the first ROM. The other ROMs are formed in the same row such that the second ROM is in column 10, the third ROM is in column 11, and the fourth ROM is in column 12. Note also that the content of each ROM is easily conveyed as follows:

```
/*
*
*      Address Inputs              Data Outputs              Programming
*
*      A4   A3   A2   A[1:0]       D3  D2  D[1:0]
*              inp_state                out_state
*
*      rctl pctl idle   fsm_v[1:0]         fsm_v[1:0]        Addr   Data
*
*      0    0    1    0x0  (Idle)    0   0   0   (Idle)      0x4    0x0
*      0    1    0    0x0  (Idle)    0   0   1   (pld)       0x8    0x1
*      1    0    0    0x0  (Idle)    0   1   0   (Idle)      0x10   0x4
*
*      0    0    1    0x1  (Pld)     1   0   0   (Idle)      0x5    0x8
*      0    1    0    0x1  (Pld)     1   0   1   (Pld)       0x9    0x9
*      1    0    0    0x1  (Pld)     0   0   2   (Data)      0x11   0x2
*
*      0    0    1    0x2  (Data)    0   0   0   (Idle)      0x6    0x0
*      0    1    0    0x2  (Data)    0   0   1   (Pld)       0xa    0x1
```

| | | | | | | | | | | | |
|---|---|---|---|---|---|---|---|---|---|---|---|
| * | 1 | 0 | 0 | 0x2 | (Data) | | 0 | 0 | 2 | (Data) | 0x12 0x2 |
| * | | | | | | | | | | | |

```
'timescale 1 ns / 100 ps
module dps_fsm_rom (clk, idle_4b, pctl_4b, rctl_4b,
idle_err, ctl_dat_err) ;
// Inputs
  input clk;              / FSM clock
  input [3:0] idle_4b;    / Idle bit array(Idle=1)
  input [3:0] pctl_4b;    / Payload control bitarray(pctl=1)
  input [3:0] rctl_4b;    / Receive Control word bit array
(ctl=1, data=0)
// Outputs
  output idle_err;        // Protocol error while idle
  output ctl_dat_err;     // Protocol error while
in the payload or data state
// Wires and Regs
wire [1:0] fsm0_v; // FSM intermediate state variables
wire [1:0] fsm1_v; // FSM intermediate state variables
wire [1:0] fsm2_v; // FSM intermediate state variables
wire [1:0] fsm3_v; // FSM intermediate state variables
wire [3:0] idle_e; // Idle error per FSM level
wire [3:0] ctl_dat_e; // ctl/data error per FSM level
reg idle_err, ctl_dat_err;
// Collapse 4 level errors into single error bits
    always @ (posedge clk) begin idle_err = |idle_e; end
    always @ (posedge clk) begin ctl_dat_err =
|ctl_dat_e; end
// always @ (posedge clk) begin fsm0_vl <= fsm0_v ;
end
/*
 * Begin FSM processing: Note that processing occurs
 * left to right -> MSB is first
 * received in time so start with most significant "_4b"
 * arrays slice [4]
 */
/* First Logic Level */
    ROM32X4 mem_3 (.AD0(fsm0_v[0]), .AD1(fsm0_v[1]),
.AD2(idle_4b[3]),
           .AD3(pctl_4b[3]), .AD4(~rctl_4b[3]),
.CK(clk),
           .DO0(fsm3_v[0]), .DO1(fsm3_v[1]),
.DO2(idle_e[0]), .DO3(ctl_dat_e[0]))
                  /* synthesis
initval="0x00000000000002240000019100800000" */
                  /* synthesis comp="mem_3" *//*
synthesis loc="R28C9" */;
/* Second Logic Level */
    ROM32X4 mem_2 (.AD0(fsm3_v[0]), .AD1(fsm3_v[1]),
.AD2(idle_4b[2]),
           .AD3(pctl_4b[2]), .AD4(~rctl_4b[2]),
.CK(clk),
           .DO0(fsm2_v[0]), .DO1(fsm2_v[1]),
.DO2(idle_e[1]), .DO3(ctl_dat_e[1]))
                  /* synthesis
initval="0x00000000000002240000019100800000" */
                  /* synthesis comp="mem_2" *//*
synthesis loc="R28C10" */;
/* Third Logic Level */
    ROM32x4 mem_1 (.AD0(fsm2_v[0]), .AD1(fsm2_v[1]),
.AD2(idle_4b[1]),
           .AD3(pctl_4b[1]), .AD4(~rctl_4b[1]),
.CK(clk),
           .DO0(fsm1_v[0]), .DO1(fsm1_v[1]),
.DO2(idle_e[2]), .DO3(ctl_dat_e[2]))
                  /* synthesis
initval="0x00000000000002240000019100800000" */
                  /* synthesis comp="mem_1" *//*
synthesis loc="R28C11" */;
/* Fourth Logic Level */
    ROM32X4 mem_0 (.AD0(fsm1_v[0]), .AD1(fsm1_v[1]),
.AD2(idle_4b[0]),
           .AD3(pctl_4b[0]), .AD4(~rctl_4b[0]),
.CK(clk),
           .QDO0(fsm0_v[0]), .QDO1(fsm0_v[1]),
.QDO2(idle_e[3]), .QDO3(ctl_dat_e[3]))
                  /* synthesis
initval="0x00000000000002240000019100800000" */
                  /* synthesis comp="mem_0" *//*
```

-continued

```
synthesis loc="R28C12" */;
endmodule
```

The above-described embodiments of the present invention are merely meant to be illustrative and not limiting. For example, although described as being instantiated in an FPGA, it will be appreciated that the ROM-based finite state machine of the present invention may be instantiated in the programmable blocks of CPLDs and other programmable devices whose logic blocks may be configured as ROMs. Moreover, rather than instantiate the logic blocks as read-only memories, they may be instantiated as random access memories that are used as read-only memories. In addition, although described with respect to the parsing of tokens according to a wire-line-level protocol such as SPI4, the finite state machine described herein may be implemented in any situation requiring a finite state machine that must sequence through multiple states in just one clock cycle. It will thus be obvious to those skilled in the art that various changes and modifications may be made without departing from this invention in its broader aspects. Accordingly, the appended claims encompass all such changes and modifications as fall within the true spirit and scope of this invention.

What is claimed is:

1. A programmable device configured to implement a finite state machine that may sequence through a plurality of states responsive to a plurality of input signals during a single cycle of a clock for the programmable device, the input signals being arranged from a first signal to a last signal, the programmable device comprising:
a plurality of programmable blocks, each programmable block being instantiated to form a memory, the memories corresponding on a one-to-one basis with the plurality of input signals such that a first memory corresponds to the first input signal, and so on, each memory being programmed to retrieve a data word that represents a next state of the finite state machine, the data word being retrieved according to an address derived both from a current state of the finite state machine and from the corresponding input signal.

2. The programmable device of claim 1, wherein each programmable block is a look-up-table-based programmable block.

3. The programmable device of claim 1, wherein the first through the last input signal correspond to sequential samples of an external bus supporting a wire-line-level protocol.

4. The programmable device of claim 3, wherein the wire-line-level protocol is SPI4.

5. The programmable device of claim 4, wherein each sample of the external bus is sixteen-bits wide.

6. The programmable device of claim 1, wherein the subset of memories are arranged such that the address for a second memory is derived from the retrieved data word form the first memory, an address for a third memory is derived from the retrieved data word from the second memory, and so on such that an address for a last memory is derived from the retrieved data word from a next-to-last memory, and wherein the programmable block instantiating the last memory is configured to register its retrieved data word responsive to the clock, the first memory being arranged to derive its address from the registered data word from the last memory.

7. The programmable device of claim 6, wherein the retrieved data words from the first through the next-to-last memory are non-clocked data signals.

8. The programmable device of claim 6, wherein the subset of programmable blocks are arranged such that the programmable block instantiating the second memory is adjacent to the programmable block instantiating the first memory, the programmable block instantiating the third memory is adjacent to the programmable block instantiating the second memory, and so on.

9. The programmable device of claim 6, wherein the plurality of programmable blocks are arranged in rows and columns and the subset of programmable blocks are arranged in a single column adjacent to one another.

10. The programmable device of claim 6, wherein the plurality of programmable blocks are arranged in rows and columns and the subset of programmable blocks are arranged in a single row adjacent to one another.

11. The programmable device of claim 1, wherein the input signals are arranged from a first to a fourth input signal.

12. The programmable device of claim 1, wherein the input signals are arranged from a first to a fifth input signal.

13. The programmable device of claim 1, wherein the memories are read-only memories.

14. A method of sequencing a finite state machine implemented in a programmable device through multiple states in a single cycle of an internal clock for the programmable device, the programmable device having a set of programmable blocks, the method comprising:
programming each programmable block to instantiate a memory, wherein each memory is programmed to retrieve a data word representing a next state of the finite state machine based upon address signals, and wherein the memories are arranged from a first memory to a last memory;
during each of a sequence of the clock cycles:
registering a plurality of input signals, wherein the plurality of input signals corresponds on a one-to-one basis with the plurality of memories such the plurality of input signals are arranged from a first input signal to a last input signal;
sequencing the finite state machine by sequentially retrieving a first data word form the first memory based upon an address derived both from an initial state and from the first input signal; then retrieving a second data word from the second memory based upon an address derived both from the first data word and from the second input signal; and so on until a last data word is retrieved from the last memory based upon an address derived from both a next-to-last data word and from the last input signal; and
registering the last data word so it may be used to form the initial state for the next clock cycle.

15. The method of claim 14, wherein the plurality of input signals is formed by sequentially sampling an external bus supporting a wire-line-level protocol.

16. The method of claim 15, wherein the wire-line-level protocol is SPI4.

17. The method of claim 14, wherein each memory has a depth of 32 words.

18. The method of claim 14, wherein each data word is 4 bits wide.

19. The method of claim 14, wherein each memory is a read-only memory.

20. A programmable device configured to implement a finite state machine that may sequence through a plurality of states responsive to a plurality of input signals during a single cycle of a clock for the programmable device, the input signals being arranged from a first signal to a last signal, the programmable device comprising:

a plurality of LUT-table based programmable blocks, each programmable block being instantiated to form a ROM, the memories corresponding on a one-to-one basis with the plurality of input signals such that a first memory corresponds to the first input signal, and so on, each memory being programmed to retrieve a data word that represents a next state of the finite state machine, the data word being retrieved according to an address derived both from a current state of the finite state machine and from the corresponding input signal, wherein for an nth memory, n being a positive integer, the current state corresponds to the data word retrieved from the (n−1)th memory.

* * * * *